United States Patent [19]

Kucsma et al.

[11] 3,932,573
[45] Jan. 13, 1976

[54] PROCESS FOR PRODUCING GLASS FIBER REINFORCED INJECTION MOLDING COMPOUNDS

[75] Inventors: Michael E. Kucsma; Gary J. Babcock; Berlin C. Harris, Jr., all of Baton Rouge, La.

[73] Assignee: Ethyl Corporation, Richmond, Va.

[22] Filed: May 2, 1974

[21] Appl. No.: 466,279

Related U.S. Application Data

[63] Continuation-in-part of Ser. No. 444,099, Feb. 20, 1974, abandoned, which is a continuation of Ser. No. 7,128, Jan. 30, 1970, abandoned.

[52] U.S. Cl. ................ 264/118; 264/122; 264/141
[51] Int. Cl.² ............................................ B29F 3/00
[58] Field of Search..................... 264/141, 118, 122

[56] References Cited
UNITED STATES PATENTS

| | | | |
|---|---|---|---|
| 2,464,746 | 3/1949 | Gering | 264/141 |
| 2,961,361 | 11/1960 | Dennis | 264/122 |
| 3,194,859 | 7/1965 | Wacker | 264/122 |

Primary Examiner—Robert F. White
Assistant Examiner—J. R. Hall
Attorney, Agent, or Firm—Donald L. Johnson; John F. Sieberth; David L. Ray

[57] ABSTRACT

A process for preparing improved glass fiber reinforced thermoplastic compositions, the products produced thereby, and articles injection molded from the thermoplastic compositions. The process includes mixing and plastifying a powdered thermoplastic resin containing glass fibers in a screw extruder, milling the plastified resin-glass blend into a sheet on a hot roll mill, and dicing the sheet into pellets. The pellets are particularly suitable for use in forming articles by injection molding.

17 Claims, 1 Drawing Figure

U.S. Patent    Jan. 13, 1976    3,932,573
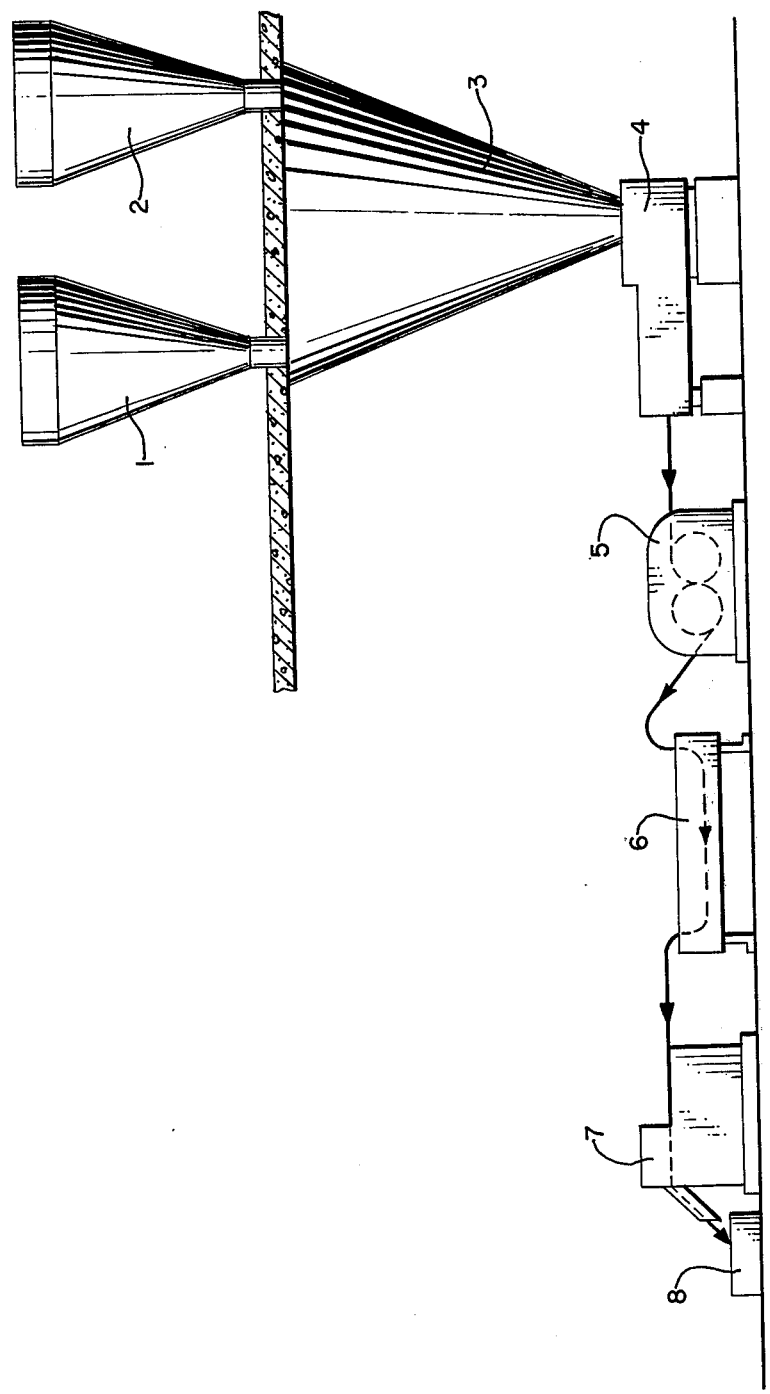

PROCESS FOR PRODUCING GLASS FIBER REINFORCED INJECTION MOLDING COMPOUNDS

CROSS-REFERENCE

This application is a Continuation-in-Part of now abandoned application Ser. No. 444,099, filed Feb. 20, 1974, which is a continuation of application Ser. No. 7,128, filed Jan. 30, 1970, now abandoned.

BACKGROUND OF THE INVENTION

Basic thermoplastics have several critical property disadvantages which limit their use in structural and engineering applications. These deficiencies include cold flow under load, high coefficient of thermal expansion, high temperature use limitations, and generally low strength properties. The use of reinforcing fibers to improve these deficiencies has been technically demonstrated in most thermoplastics. The composite materials have improved strength, temperature resistance, dimensional stability, and rigidity.

The ability of these materials to be fabricated by injection molding at rates equivalent to non-reinforced plastics coupled with improvements in critical engineering properties has not only placed these materials in a position to displace their non-reinforced counterparts in many applications, but also to compete for markets now held by thermosets, non-ferrous metals, and certain alloys.

The mechanism for effective reinforcement of thermoplastics by high strength fibers is based on the transfer and equal distribution of the applied stress from the resin to the high strength fiber reinforcement. Intimate contact of the resin and fiber, through chemical bonding or physical attraction, is essential. Secondarily, uniform distribution of the fiber into the resin matrix must be accomplished with minimum destruction of the fiber.

Glass fibers are generally used to reinforce thermoplastics because of their relatively low cost, availability, and high strength properties. The glass fibers are usually treated with coupling agents (silanes or chrome complexes) which are thought to form chemical bridges between resin and glass, binders to maintain strand integrity and protect the glass during handling, and in some cases anti-static agents.

While most properties of thermoplastics reinforced with glass fibers are improved, some properties, particularly impact strength and deflection temperature, are highly dependent on the chacteristics of the unreinforced thermoplastic involved. Improvements in tensile and flexural strengths, rigidity, and dimensional stability are directly proportional to fiberglass content.

THE INVENTION

It is an object of this invention to provide an improved process for the production of fiber reinforced thermoplastic resinous material suitable for injection molding.

These benefits and other advantages are achieved in a process for the production of a thermoplastic composition which includes feeding a filamentary reinforcing agent and an organic thermoplastic resin to a screw extruder, mixing and plastifying the resin and the agent in the extruder, extruding the mixture of resin and reinforcing agent, milling the mixture to a sheet on a roll mill, and dicing the sheet into pellets.

The compositions produced by the process of the present invention are characterized by improved tensile strength, rigidity, and deflection properties. They also have the ability to flow readily in injection molds having complex shapes and produce high strength structural shapes having relatively smooth surface finishes.

The various components of the apparatus used in performing the process and making the product of the present invention are illustrated in the drawing. The thermoplastic resin is deposited in hopper 1 and the glass fibers are deposited in hopper 2 by any conventional means. The thermoplastic resin and glass fibers are metered and allowed to free-fall from hoppers 1 and 2 into the extruder hopper 3. The stream of thermoplastic resin and glass fibers commingle while freefalling downward through hopper 3 into extruding mixer 4. Mixer 4 may be any conventional single screw or twin-screw extruder equipped with heating means to plastify the thermoplastic resin mix therein. The resinglass fiber mixture is discharged from the extruder and conveyed by any conventional means to a hot two-roll mill 5 which mills the mixture of thermoplastic resin and glass fibers into a sheet. The sheet is cooled in cooling tank 6 and is then transferred to dicer 7. Dicer 7 dices the sheet into small pellets which are ejected into container 8. The pellets may then be packaged for shipment or transferred directly to injection molding equipment for injection molding any desired article. The thermoplastic resin and the glass fibers may also be mixed together in a conventional mixer, such as a ribbon blender, prior to adding the mixture to the plastifying extruder. It is necessary that the extruder be equipped with heating means adequate to plastify the blend of thermoplastic resin. The extruder must be operated at a temperature sufficiently high enough to plastify the thermoplastic resin mixed therein. This temperature is dependent upon the specific type of thermoplastic resin being mixed and plastified in the extruder. The screw speed and extrusion rate vary with the type and size of the extruder being used, and with the type and relative proportions of glass and thermoplastic resin being used.

The preferred extruders are twin-screw extruders, i.e., extruders having two screws aligned parallel to each other in a common chamber. The most preferred extruder is the twin-screw extruder-mixer manufactured by the Farrel Company, a Division of U.S.M. Corporation, labeled the "Farrel Continuous Mixer". The Farrel twin-screw extruder-mixer has two helical threads on a portion of each screw shaft in addition to conventional screw threads. The helical threads increase the agitation of the mixture and result in a very uniform mixture. The extruder also contains heating means to plastify the resin being mixed.

The roll mill may be any conventional roll mill equipped with means for heating the rollers on the mill. The rollers must be sufficiently hot to soften the glass reinforced plastified resin composition extruded from extruder 4 so that the composition may be milled into sheets. The temperature of the rollers is dependent upon the specific type of thermoplastic resin being mixed and plastified in the extruder.

The cooling tank 6 may be any conventional tank adapted to contain a coolant fluid such as water. Means may be incorporated in or adjacent to the tank to cool the coolant fluid, such as cooling coils, a cooling tower, or the like. The temperature of the coolant must be sufficiently low to cool the sheet received from roll mill 5 to a solid, rigid state.

Dicer 7 may be any conventional dicer. The preferred dicer is adapted to produce a pellet in the general shape of a cube having edges between about ⅛-inch to about ¼-inch in length.

Any thermoplastic resinous material which is heat formable may be employed in the method of the present invention. Suitable thermoplastic resins include polymers and copolymers of the fluorocarbons, the alkenyl aromatic resins exemplified by polystyrene, styrene copolymers, blends and graft copolymers of styrene and rubber, and the like; the polyvinyl halides, polyvinylidene halides, and copolymers thereof, such as are generally known as sarans; super polyamides, such as Nylon 66 (a condensation product of hexamethylenediamine and adipic acid); polyolefins, such as polyethylene, polypropylene, and copolymers thereof; vinyl acetate and its derivatives; the acrylics; coumarone-indene resins; polyoxymethylenes; the vinyl ethers; the vinyl ketones; and copolymers and physical mixtures of the foregoing resins. A suitable copolymer of the foregoing resins is a copolymer of acrylonitrile-butadiene-styrene (ABS).

Exemplary of the fluorocarbon monomers which may be employed in practicing the embodiments of this invention are: fluoroethylene-hexafluoropropylene mixtures, trifluoroethylene, and chlorotrifluoroethylene.

The vinyl halide monomers which may be employed in the present invention are exemplified by: vinyl chloride, vinyl bromide, and vinyl fluoride. A particularly preferred embodiment of the present invention employs vinyl chloride as the principal monomer used to prepare the resin emulsion.

Exemplary of the vinylidene halide monomers which can be used in the present invention are: vinylidene fluoride, vinylidene chloride, and vinylidene bromide.

The styrene monomers (i.e., vinyl aromatic compounds) which may be employed in the preferred embodiments of this invention include amino styrene, 4-benzyl styrene, 2-bromo styrene, 3-bromo styrene, 4-bromo styrene, 2-bromo-trifluoromethyl styrene, 3-sec-butyl styrene, 3-tert-butyl styrene, 4-tert-butyl styrene, 3-carbomethoxy styrene, 3-carboxy styrene, 2-chloro styrene, 3-chloro styrene, 4-chloro styrene, 4-cyano styrene, 4-cyclohexyl styrene, 2,3-dichloro styrene, 2,4-dichloro styrene, 3,5-dichloro styrene, 3,4-dimethoxy styrene, 2,4-dimethyl styrene, 2,5-dimethyl styrene, 3,4-dimethyl styrene, 3,5-dimethyl styrene, 4-N,N-dimethylamino styrene, 4-N,N-dimethylsulfonamide styrene, 4-ethyl styrene, 2-fluoro styrene, 3-fluoro styrene, 4-fluoro styrene, 3-fluoro-4-trifluoromethyl styrene, 2-methoxy styrene, 3-methoxy styrene, 4-methoxy styrene, 3-methyl styrene, 3-methyl-4-methoxy styrene, 3-methyl-6-methoxy styrene, 4-methyl styrene, 2-methyl-4-methoxy-5-isopropyl styrene, and the like.

Alpha-substituted styrene monomers such as the following may be used in lieu of the styrene monomers named hereinbefore; alpha-chloro styrene, alpha-cyano styrene, alpha-methyl styrene, alpha-methyl-4-bromo styrene, alpha-methyl-3-chloro styrene, alpha-methyl-4-ethoxy styrene, alpha-methyl-2-fluoro styrene, alpha-methyl-4-methoxy styrene, alpha-methyl methyl styrene, alpha-methyl pentachloro styrene, alpha-methyl tetrachloro styrene, alpha-methyl trichloro styrene, alpha-methyl-3-trifluoromethyl styrene, and the like.

Typical of the acrylics that may be used in the present invention are: methylmethacrylate, methylacrylate, ethylacrylate, acrylonitrile, and the like.

Exemplary of vinyl acetate and its derivatives are the vinyl acetals and vinyl alcohol. Particularly preferred among the vinyl acetals are: vinyl propional, vinyl butyral, vinyl pentanoal, vinyl hexanol, vinyl heptanoal, vinyl octanoal, vinyl nonanoal, vinyl decanoal, vinyl undecanoal, vinyl dodecanoal, and the like.

Representative of the vinyl ethers which may be used in the present invention are: vinyl methyl ether, vinyl ethyl ether, vinyl-N-propyl ether, vinyl isopropyl ether, vinyl butyl ether, vinyl-sec-butyl ether, vinyl isobutyl ether, vinyl-tert-butyl ether, vinyl-n-pentyl ether, vinyl isopentyl ether, vinyl-n-hexyl ether, vinyl isohexyl ether, vinyl-n-heptyl ether, vinyl isoheptyl ether, vinyl-n-octyl ether, vinyl isooctyl ether, vinyl-n-nonanoal ether, vinyl phenyl ether, vinyl-p-tolyl ether, vinyl-m-tolyl ether, vinyl-o-tolyl ether, vinyl benzyl ether, vinyl-p-nitrophenyl ether, vinyl-m-nitrophenyl ether, vinyl-o-nitrophenyl ether, vinyl cresol ether, vinyl isoamyl ether, and the like.

Exemplary of the polyvinyl ketones which may be used in the present invention are: vinyl methyl ketone, vinyl ethyl ketone, vinyl-n-propyl ketone, vinyl isopropyl ketone, vinyl butyl ketone, vinyl-n-butyl ketone, vinyl-sec-butyl ketone, vinyl-tert-butyl ketone, vinyl isobutyl ketone, vinyl-n-pentyl ketone, vinyl isopentyl ketone, vinyl-m-hexyl ketone, vinyl-n-heptyl ketone, vinyl-n-octyl ketone, vinyl-n-ononaoal ketone, vinyl-n-decyl ketone, vinyl benzyl ketone, vinyl phenyl ketone, vinyl-m-tolyl ketone, vinyl-o-tolyl ketone, vinyl-p-tolyl ketone, vinyl isoamyl ketone, vinyl naphthyl ketone, vinyl chloromethyl ketone, and the like.

A great variety of filamentary reinforcing agents may be used in the present invention including certain thermoplastic materials when utilized with other resinous materials which have a significantly lower heat forming temperature than does the reinforcing material. Other suitable reinforcing fibrous filaments include asbestos fibers, and the like. Particularly preferred however are glass fibers.

It is preferred that the glass fibers used in accordance with the present invention be given a coating using a coupling or bonding agent to assist joining of the polyvinyl chloride to the individual glass filaments. Any number of commercially available coupling agents may be utilized for treating the glass fibers employed in the compound of the present invention, particularly organosilane-type coupling agents. Examples of suitable silanes are found in U.S. Pat. Nos. 2,563,288; 2,563,589, and 3,318,757. Werner complexes as disclosed in U.S. Pat. No. 2,552,910 may also be utilized as coupling agents. Many additional agents are listed in the paper entitled "The Influence of Reinforcements on Strength and Performance of Fiber Glass Reinforced Thermoplastics" by J. T. Inglehart et al., given at the 22nd meeting of Reinforced Plastics Division of the Society of Plastics Industry, Inc. (reprint available from Owens-Corning Fiberglass Corp., Technical Center, Grandville, Ohio).

It is preferred to utilize chopped multi-filament glass fiber strands having some twist therein. It is also preferred to use glass filaments provided with a sizing material which protects the individual filaments during handling and compounding as the glass fiber is worked into the thermoplastic resin. Chopped glass fibers having a strand length from ⅛-inch to 2 inches may be used to prepare compounds of the present invention. Strands having a length between ⅛-inch and ½-inch are preferred. However, the most desirable length for use in the present compounds are chopped strands of about ¼-inch length. The preferred glass fiber is Owens-Corning Fiber Glass 885-BB which comes in ¼-inch lengths or Pittsburg Plate Glass Industries HR-3129, also in ¼-inch glass lengths.

A preferred thermoplastic resin composition for use in the present invention is a resin composition comprising about 100 parts by weight of a vinyl chloride polymer, about 1 to about 15 parts by weight of a coumarone-indene resin, and about 5% to about 50% glass fibers by weight of resin composition. The most preferred composition comprises about 100 parts by weight of polyvinyl chloride, from about 5 to 10 parts by weight of a coumarone-indene resin, and about 10% to 30% glass fibers by weight.

One particularly suitable homopolymer of vinyl chloride that can be used in the composition of the present invention is manufactured by Ethyl Corporation and designated SM-175. SM-175 is a homopolymer of vinyl chloride having a bulk density of about 0.53 and a relative viscosity of about 1.75 plus or minus 0.02, determined using one gram of resin per 100 grams of cyclohexanol and measuring the viscosity at 25°C. SM-175 has a particle size distribution of about 5% between 250 and 177 microns, about 35 to 40% between 177 and 150 microns, about 40 to 45% between 150 and 105 microns, about 10 to 15% between 105 and 74 microns, and about 10% below 74 microns in diameter.

The coumarone-indene resin used in the compound may be any one of the number of commercially available coumarone-indene resins. One of the preferred resins is Nevidene LX-509 available from Neville Chemical Company. The coumarone-indene resin preferred for use in the composition of the present invention has the structural formula:

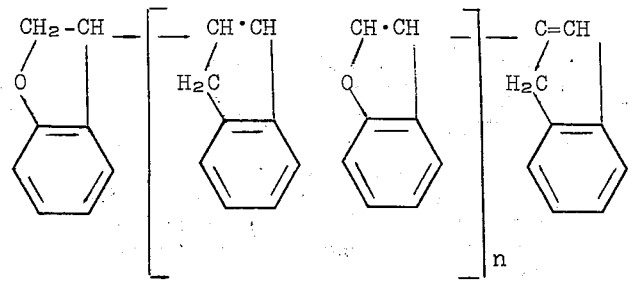

Other suitable commercially available coumarone-indene resins are those known as R-1 Nevindene, R-3 Nevindene, R-5 Nevindene and R-6 Nevindene available from Neville Chemical Company, Cumar W and Cumar V resins made by Allied Chemical Company and Picoumarone resins 410, 410-L, 410-H, 410-HL, 410-EHL, 450-EH and 450-L made by Pennsylvania Industrial Chemical Company. Mixtures of any of the foregoing coumarone-indene resins may be used to prepare the polyvinyl chloride compounds of the present invention. It is preferred that such resins have a softening point (ring and ball test or ASTM-28-51T) of 100°C or higher. Those resins having a softening point between 126° and 155°C are particularly preferred. The coumarone-indene resins can be used in the compound of the present invention in an amount of from about 1 to about 15 parts by weight per 100 parts of polyvinyl chloride resin used. A preferred weight of the coumarone-indene resins is from about 4 parts by weight to about 10 parts by weight with the most preferred being about 8 parts by weight. Additionally, pigments, fillers, stabilizers, inhibitors, lubricants, and extrusion aids may be incorporated in the polyvinyl chloride composition of the present invention. The invention is further illustrated by the following examples.

EXAMPLE I

A blend of the following ingredients was prepared, each of the ingredients being specified in parts by weight. 100 Parts of polyvinyl chloride resin powder (Ethyl Corp. SM-175), 5 parts of a stabilizer (McGregor 810 made by John R. McGregor Lead Co.), 1.5 parts of another stabilizer (DS-207 manufactured by National Lead Company), 1 part of an additional stabilizer (Mark WS manufactured by Argus Chemical Co.), 5 parts of a calcium carbonate filler (Winnofil S manufactured by Imperial Chemical Industries America), 8 parts of an acrylic processing aid (K-120-N manufactured by Rohm and Haas, Inc.), 0.8 parts of a wax lubricant (PA-190 manufactured by American Hoesch Co.), and 8 parts of a coumarone-indene resin (LX-509 manufactured by Neville Chemical Co.) were charged to a conventional mixer (ribbon blender) and mixed for 20 minutes at a temperature of about 130°F. The powder blend was then transferred to hopper 1 from which it was fed at a controlled rate of 2,800 pounds per hour to 4, a twin-screw extruder-mixer (Farrel Continuous Mixer manufactured by Farrel Company, Division of U.S.M. Corp.). ¼-Inch chopped glass fiber strands were fed into hopper 2, which in turn feeds the fibers into hopper 3 at a rate of 700 pounds per hour. The discharging chopped glass fiber strands were merged into the discharge of the powder blend from hopper 1 as the mixture free-fell into the feed section of the twin-screw extruder 4. The powder blend and glass fibers were fluxed (plastified) and mixed quite thoroughly in the chamber of the extruder. The fluxed product was cut into 3 × 6 × 6 inch bricks as it emerged from the continuous mixer discharge orifice. The bricks were dropped onto a conveyor and transferred to the nip of a 26 × 84 inch twin roll compound mill 5. The mill was steam heated and controlled to hold a temperature of 325°F on the takeoff roll and 300°F on the backup roll. The mill was run at a takeoff roll surface speed of 125 feet per minute. The high processing aid level (8 parts of K-120-N acrylic processing aid) was necessary to improve the tension of the material on the mill, because the presence of the glass fibers and the polyvinyl chloride caused loss of tack on the mill. The strips or sheets were taken from the mill as continuous belt 9 × 5/32 inches. The sheet was drawn through a hot water bath of 150°F and fed into a 14 inch dicer (Cumberland Engineering Co., Model No. 10,284). The glass fiber reinforced composition diced into pellets easily over a relatively wide temperature range. The average size of the generally cube-shaped pellets was about 3.0 millimeters by about 3.5 millimeters by about 3.0 millimeters.

The glass fibers in the pellets were found to be substantially randomly dispersed throughout the pellet. The glass fibers as originally introduced into the resin composition were gathered together into bundles; however, the glass fibers in the pellets were found to be separated each from the other. The glass fibers in the pellets ranged in length from about 0.1 millimeters to about 1.2 millimeters. At least about 50% of the total number of the glass fibers in the pellet were between about 0.5 and about 0.8 millimeters in length.

The pellets were injection molded into test samples which were found to have the following properties:

| Property | Units | Testing Standard |
|---|---|---|
| Specific Gravity | 1.58 | ASTM-D792 |
| Mold Shrinkage in/in | 0.001 | ASTM-D955 |
| Water Absorption % (24 hrs) | 0.010 | ASTM-D570 |
| Tensile Strength, psi | | |
| 73°F | 14,000 | ASTM-D638 |
| 120°F | 11,000 | |
| 140°F | 9,000 | |
| Tensile Elongation, % | Less than 5 | ASTM-D638 |
| Tensile Modulus, psi | | ASTM-D638 |
| 72°F | 1,200,000 | |
| 120°F | 1,100,000 | |
| 140°F | 1,000,000 | |
| Flexural Strength, psi | 21,000 | ASTM-D790 |
| Flexural Modulus | 1,000,000 | ASTM-D790 |
| Impact Strength, Izod | | |
| Notched ¼" × ½" bar | 0.8 | ASTM-D256 |
| Unnotched ¼" × ½" bar | 8.0 | |
| Heat Distortion Temperature annealed | | |
| 66 psi °F | 187 | ASTM-D648 |
| 264 psi °F | 180 | |
| Coef. of Linear Thermal expansion in/in/°F | $1.2 \times 10^{-5}$ | ASTM-D696 |
| Flammability | Non-burning | ASTM-D635 |

EXAMPLE II

A blend of the following ingredients was prepared, each of the ingredients being specified in parts by weight. 100 Parts of polyvinyl chloride resin powder (Ethyl Corp. SM-175), 5 parts of a stabilizer (McGregor 810 made by John R. McGregor Lead Co.), 1.5 parts of a dibasic lead stearate stabilizer (DS-207 manufactured by National Lead Co.), 0.5 parts of an additional stabilizer (Mark WS manufactured by Argus Chemical Co.), 5 parts of a calcium carbonate filler (Winnofil S manufactured by Imperial Chemical Industries America), 3 parts of an acrylic processing aid (K-120-N manufactured by Rohm and Haas, Inc.), 0.7 parts of a wax lubricant (PA-190 manufactured by American Hoesch Co.) and 8 parts of a coumarone-indene resin (LX-509 manufactured by Neville Chemical Co.), were charged to a conventional mixer and mixed until all components were thoroughly blended together. 25% By weight of ¼-inch long glass fibers were added to the mixture. The glass-containing mixture was then transferred into a screw extruder. The mixture was mixed and plastified in the screw extruder. The fluxed (plastified) product was milled on a two-roll mill and diced into pellets. Samples of injection molded pellets had the following properties when tested according to the ASTM standards used in Example I:

| | |
|---|---|
| Tensile strength, psi — 73°F | 15,000 |
| Tensile elastic modulus, psi × 10³ | 1,400 |
| Flexural strength, psi | 22,200 |
| Flexural modulus, psi × 10³ | 1,150 |
| Izod impact strength, ft.lb/in notched ¼" × ½" bar | 0.85 |
| Heat distortion temperature | |
| 66 psi °F | 185.0 |
| 264 psi °F | 180.0 |

EXAMPLE III

A blend of the following ingredients was prepared, each of the ingredients being specified in parts by weight. 100 Parts of a copolymer of styrene and acrylonitrile containing about 70% by weight styrene and about 30% by weight acrylonitrile (Tyril 867-21-7 manufactured by Dow Chemical Co.), 25 parts of ¼-inch long glass fibers, and 5 parts of a calcium carbonate filler (Winnofil-S manufactured by Imperial Chemical Industries, America). The blend was transferred to a twin-screw extruder-mixer (Farrel Continuous Mixer manufactured by Farrel Company, a division of U.S.M. Corp.). The blend was fluxed (plastified) in the twin-screw extruder-mixer. The fluxed product was milled on a two-roll mill and diced into pellets. Samples of injection molded pellets had the following properties when tested according to ASTM standards used in Example I:

| | |
|---|---|
| Specific Gravity | 1.21 |
| Tensile, psi at 73°F | 10,220 |
| Tensile Modulus, psi at 73°F | 887,000 |
| Flex. Strength, psi | 15,460 |
| Flex. Modulus psi | 776,000 |
| Notched Izod, ft/lb/in | .40 |
| Heat Distortion Temperature at 264 psi °F | 205 |

What is claimed is:

1. A process for the production of a thermoplastic composition comprising:
   a. feeding a stream of glass fibers and a separate stream of organic plastic resin to a common hopper, said hopper being adapted to allow said glass fibers and said resin to free-fall into a screw extruder;

b. mixing and heating said resin and said glass fibers in said extruder until said resin is plastified;
c. extruding said mixture of said resin and said fibers;
d. milling said mixture to a sheet on a roll mill having rollers heated sufficiently hot to soften said mixture;
e. cooling said sheet to a rigid state; and
f. dicing said sheet into pellets.

2. The process of claim 1 wherein said extruder is a twin-screw extruder.

3. The process of claim 1 wherein said resin includes 100 parts by weight of polyvinyl chloride and about 1 to about 15 parts by weight of a coumarone-indene resin having the structural formula:

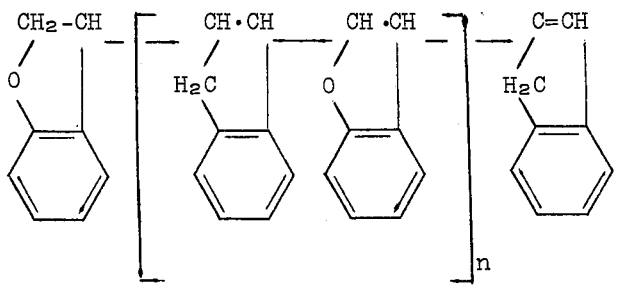

4. The process of claim 1 wherein said resin includes a stabilizer, a lubricant, and a filler.

5. The process of claim 1 wherein said extruder has two helical threads on a portion of each screw shaft.

6. The process of claim 1 wherein said resin is polyvinyl chloride.

7. The process of claim 1 wherein said glass fibers comprise about 5 percent to about 50 percent by weight of said resin composition.

8. A process for the production of a thermoplastic composition comprising:
a. feeding a filamentary reinforcing agent and an organic thermoplastic resin to a screw extruder having heating means;
b. mixing and heating said resin and said agent in said extruder until said resin is plastified;
c. extruding said mixture of said resin and said agent;
d. milling said mixture to a sheet on a roll mill having rollers heated sufficiently hot to soften said mixture;
e. cooling said sheet to a rigid state; and
f. dicing said sheet into pellets.

9. The process of claim 8 wherein said resin is polyvinyl chloride.

10. The process of claim 8 wherein said agent is glass fiber.

11. The process of claim 8 wherein said resin includes 100 parts by weight of polyvinyl chloride and about 1 to about 15 parts by weight of a coumarone-indene resin.

12. The process of claim 8 wherein said glass fibers comprise about 5 to about 50% by weight of said pellets.

13. The process of claim 8 wherein said extruder is a twin-screw extruder.

14. The process of claim 8 wherein said resin includes a stabilizer.

15. The process of claim 8 wherein said resin includes a lubricant.

16. The process of claim 8 wherein said resin includes a filler.

17. The process of claim 8 wherein said glass fibers in said pellets range in length from about 0.1 millimeters to about 1.2 millimeters, and at least about 50 percent of the total number of said glass fibers are between about 0.5 and about 0.8 millimeters in length.

* * * * *